United States Patent [19]

Blomgren, Sr. et al.

[11] 3,942,575

[45] Mar. 9, 1976

[54] PORTABLE TIRE CHANGING APPARATUS AND METHOD FOR MOUNTING AND DEMOUNTING HEAVY DUTY TIRES ON A WHEEL

[75] Inventors: Oscar C. Blomgren, Sr.; Oscar C. Blomgren, Jr., both of Lake Bluff, Ill.

[73] Assignee: Tuxco Corporation, North Chicago, Ill.

[22] Filed: Aug. 9, 1974

[21] Appl. No.: 496,076

[52] U.S. Cl. ............................. 157/1.26; 157/117
[51] Int. Cl.² ........................................ B60C 25/06
[58] Field of Search ......... 157/1.17, 1.2, 1.22, 1.24, 157/1.26

[56] References Cited
UNITED STATES PATENTS

| | | | |
|---|---|---|---|
| 1,480,371 | 1/1924 | Cattoni | 157/1.22 |
| 2,691,412 | 10/1954 | Wood | 157/1.26 |
| 2,925,124 | 2/1960 | Harrod | 157/1.26 |
| 3,841,380 | 10/1974 | Marshall | 157/1.26 |

FOREIGN PATENTS OR APPLICATIONS

| | | | |
|---|---|---|---|
| 637,555 | 5/1950 | United Kingdom | 157/1.22 |
| 18,875 | 2/1910 | United Kingdom | 157/1.17 |
| 454,352 | 2/1949 | Canada | 157/1.24 |

*Primary Examiner*—Al Lawrence Smith
*Assistant Examiner*—James G. Smith
*Attorney, Agent, or Firm*—Lockwood, Dewey, Zickert & Alex

[57] ABSTRACT

Portable tire changing apparatus and method for mounting and demounting heavy tire duty tires on a wheel including a hydraulic cylinder having removable shoes for mounting and demounting, respectively. The cylinder is removably fastened to and retained by additional mounting and demounting structures, both of which are compact and anchorable to a wheel hub eliminating the necessity of affixing a wheel and tire assembly to a bulky stand. The mounting and demounting structures utilize wheel hub rigidity as a base to retain differing supporting mechanisms which position the cylinder enabling the attached respective shoe to maneuver the tire beads away from and over a wheel rim flange.

16 Claims, 25 Drawing Figures

PORTABLE TIRE CHANGING APPARATUS AND METHOD FOR MOUNTING AND DEMOUNTING HEAVY DUTY TIRES ON A WHEEL

This invention relates in general to a tire changing apparatus, and more particularly to a portable tire changing apparatus and method for mounting and demounting heavy duty tires on single or multiple piece, flanged drop center wheels.

Heretofore, many types of tire changing devices have been utilized. Such devices usually include a frame or stand which is positioned on a flat surface, such as a floor. The tire-wheel assembly is then affixed to the frame before other devices are applied to the tire to remove it from the wheel. Such devices are not portable thereby requiring tire changing operations only at a base station. Other tire changing apparatus includes pry bars and clamps of various shapes and sizes wedged between the tire and wheel to facilitate removal of the tire therefrom.

The invention overcomes the above difficulties and provides a portable device capable of mounting and demounting special extra heavy duty tires from wheels where other heretofore known tire changing apparatus has been unable to do so on a consistent basis. For instance, one such example is the Pershing missile carrier which includes a 16.5/19.5 inch tire of 10 ply super single nylon cord construction mounted on a one piece double flanged drop center wheel. The invention, being extremely compact and portable, also fulfilled a need for changing tires in the field, as the Pershing missile carrier is designed for continuous mobile movement. However, the apparatus of the invention may be utilized to mount and demount tires of various shapes and sizes in any location.

The tire changing apparatus of the invention includes tire demounting and mounting assemblies, each of which support a common detachable hydraulic cylinder. A portable pump is provided to power the cylinder, and interchangeable shoes mount on the piston rod of the cylinder for engaging the tire during demounting and mounting operations. A bead breaking shoe is used for demounting, while a bead forcing shoe is used for mounting.

The tire demounting assembly includes an anchor member having a tubular body with fittings at each end, an annular flange intermediate the ends of the body and perpendicular to the body, and mounting holes located in spaced circumferential relation to the flange to enable securement to the wheel hub. An extensible swinging arm is attachable to the anchor member at either one of the fittings. The free end of the arm has a mounting sleeve located perpendicularly therethrough which detachably receives the hydraulic cylinder. A tire tread retaining tool is also located at the free end of the arm.

Rotational movement of the arm relative the anchor member and extensible adjustment of the arm allows varying placement of the hydraulic cylinder and bead breaking shoe to positions adjacent any segment of a tire bead and side wall of a tire mounted on the wheel.

In the demounting method, the bead breaking shoe is placed adjacent the juncture of the wheel rim flange and tire bead segments on the side of the wheel having the drop center portion. Actuating the cylinder and shoe by means of the pump forces the tire bead away from the wheel rim flange around a segment of the tire circumference. Repeating the method at intervals around each side of the tire separates the entire bead from its adjacent wheel rim flange. Next, the bead breaking shoe is activated against a segment of the tire side wall and the arm is retracted or shortened to move the shoe towards the center of the wheel and causing the tread retaining tool to push the adjacent tire bead segment into the drop center wheel portion. The movement of one tire bead portion toward the wheel center moves the circumferentially opposing bead portion radially outward from its adjacent rim flange. Tire irons or a hydraulic bead lifting mechanism may be used to raise or pry the opposing bead portion over the adjacent rim flange. A tire iron is then used to enlarge the pried-up portion until the entire bead is off the wheel.

The arm is then removed from the base or anchor member and the tire and wheel together with the anchor member mounted in place is flipped over. The arm is remounted on the anchor member. The second tire bead is separated from its adjacent rim flange as was the first. The second side wall is then forced into the wheel drop center portion as described with the first side wall. The tire bead portion opposite that segment which is forced into the rim drop center is lifted over the first wheel rim flange as before. A tire iron is then used to enlarge that portion until the tire is completely off the rim.

The tire mounting assembly includes a cylinder retaining hook which connects to the hydraulic cylinder and hooks which connects to the hydraulic cylinder and hooks over the wheel hub portion through a central opening in the wheel and bears against the wheel. A pair of special C-clamps fit over the rim flange to retain a portion of the tire bead, and a removable bead stretching shoe mounts on the cylinder piston rod for engaging the tire bead.

In the tire mounting method, a tire is arranged on top of a horizontally placed wheel so a portion of one tire bead is located between the wheel rim flanges and retained by the C-clamps. The cylinder retaining hook is positioned through the hub and the hydraulic cylinder is mounted on the hook. The bead stretching shoe is placed on the piston rod and the cylinder is oriented where actuation of the cylinder causes the shoe to engage a portion of the tire bead adjacent that portion retained by a C-clamp. Portions of the bead adjacent the C-clamp are then lifted over the rim flange. The C-clamp is then loosened, repositioned further along the rim flange, and retightened to secure the additional bead portion over the rim flange. The cylinder, hook, and bead stretching shoe are then repositioned around the hub circumference to further stretch another portion of the bead over the rim flange. As the method is repeated, more of the bead is lifted over the rim flange until the entire bead is so positioned within the flanges.

A portion of the second tire bead is then placed over the same wheel rim flange and retained by the C-clamps as previously described with the first tire bead. The cylinder retaining hook, cylinder, and bead forcing shoe are maneuvered in the manner previously delineated to force the second tire bead over the wheel rim flange. The C-clamps are again maneuvered in an ever widening arc as increasing portions of the bead are lifted over the rim flange until the entire second bead is mounted between the flanges.

Accordingly, it is an object of the present invention to provide a new and improved tire changing apparatus and method for mounting and demounting tires on a wheel rim.

Another object of the present invention is in the provision of a portable tire changing apparatus and method wherein the apparatus utilizes the rigidity of the wheel upon which the tire is mounted, therefore, eliminating a bulky stand and allowing tire changes to be made in the field.

Other objects, features and advantages of the invention will be apparent from the following detailed disclosure, taken in conjunction with the accompanying drawings, wherein like reference numerals refer to like parts, in which:

Figure 1:
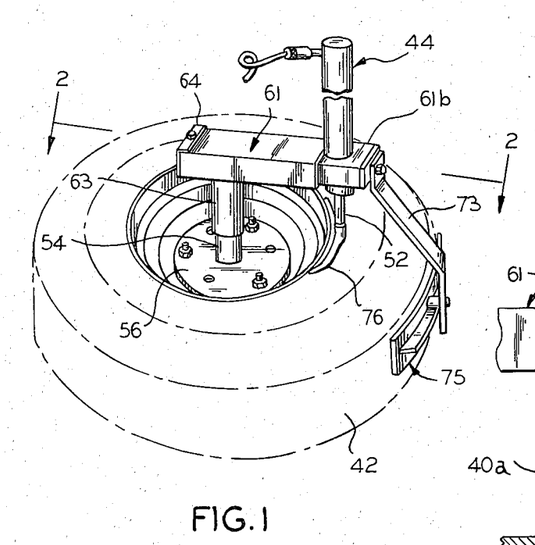
FIG. 1 is a perspective view of the demounting assembly mounted on a tire and wheel assembly wherein the bead breaking shoe is breaking the bead of the tire from the wheel rim flange.
Figure 2:
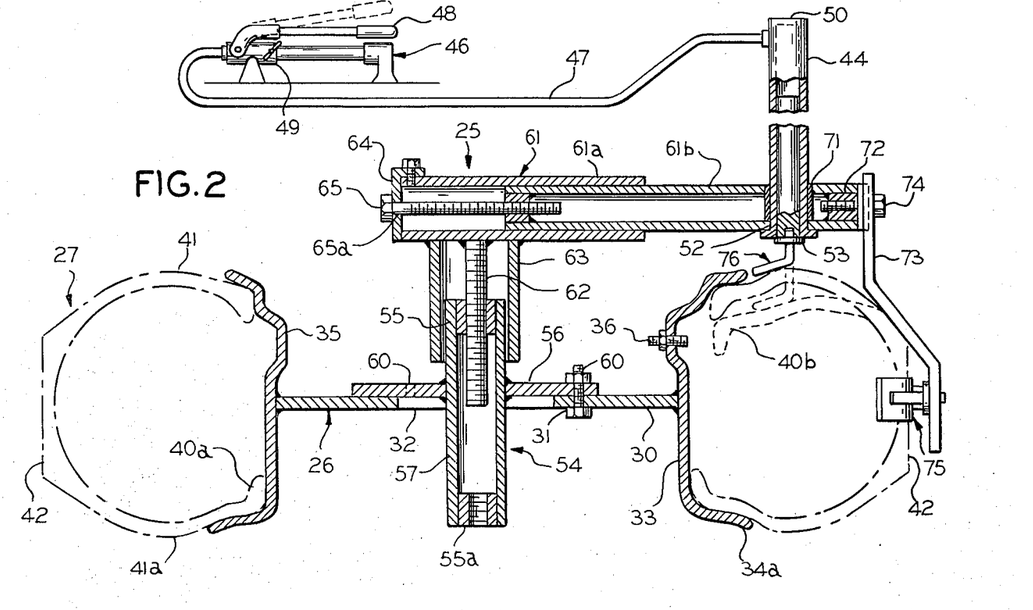
FIG. 2 is a cross-sectional view taken substantially along line 2—2 of FIG. 1 and illustrating operation of the bead breaking shoe.

Referring to FIGS. 1 and 2, the tire demounting assembly is shown generally at 25 affixed to a wheel 26 having a tire 27 mounted thereon. Wheel 26 includes a hub 30 having a plurality of mounting holes 31 circumferentially spaced around a central opening 32. A wheel rim 33 is actuated to the outer circumference of hub 30, which includes outwardly extending radial flanges 34–34a on either side of the wheel rim, and a drop center portion 35 located at one side of wheel hub 30. It can be appreciated that some wheels may have a drop center portion on both sides of the wheel hub and may be of one, two, or more piece construction. The tire changer of the invention can be utilized for all such wheels. When the tire 27 is inflated, air is supplied through an air valve 36 mounted in the rim. Tire 27 includes beads 40–40a at the extreme radial interior of each side of the tire, which when mounted on the wheel, are interiorly adjacent wheel rim flanges 34–34a, respectively. Side walls 41–41a extend outwardly from each bead and a tread wall 42 located at the tire outer circumference extends between the outer ends of the side walls.

Figures 10, 11:
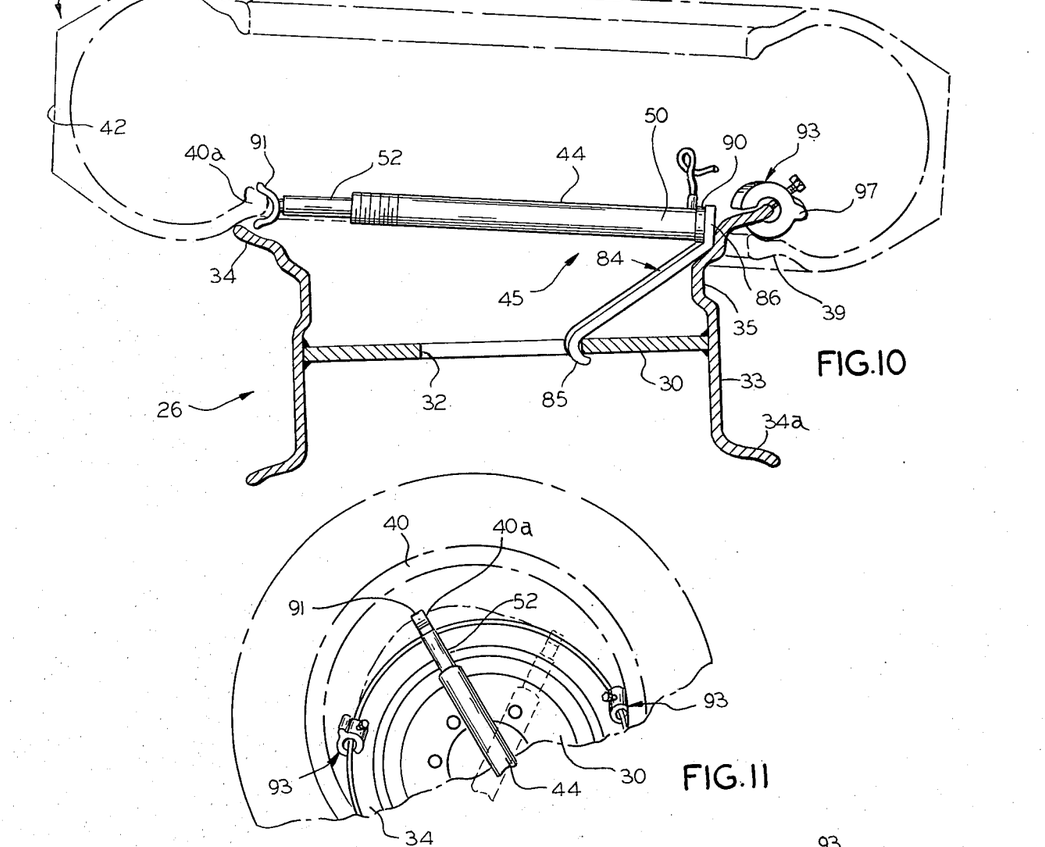
FIG. 10 is a cross-sectional view of a wheel rim and a tire placed on top of the wheel rim for mounting purposes, together with the tire mounting assembly of the invention in position, where a segment of one tire bead is placed between the rim flanges and retained in position by C-clamps and the mounting assembly shown in position to commence forcing the bead over the flange.
FIG. 11 is a partial perspective view of the first tire bead being forced over the rim flange showing the C-clamps positioned further apart than during the initial mounting operation, and the bead forcing shoe and hydraulic cylinder in a position to force more of the bead over the rim flange.

A common hydraulic cylinder 44 is used with both the demounting assembly 25 of FIG. 1 and the mounting assembly 45 shown generally at FIG. 10. A portable hydraulic pump 46 connected by a flexible tubular line 47 provides power for actuating the cylinder. The hydraulic pump 46 is manually operated in this embodiment by means of a pump handle 48. A control valve 49 may block the return of fluid to the pump where the cylinder may be actuated or allow return of fluid to permit the cylinder to be deactivated. Hydraulic cylinder 44 includes a blind end 50, a threaded rod end 51, and a piston rod 52 having a socket 53 in its free end.

The tire demounting assembly 25 includes an anchor member 54 having a tubular body 57 with female threaded fittings 55–55a located at each end. A radially extending annular flange 56 is attached to the body and perpendicular thereto at a position slightly offset its center. The flange is offset slightly to match the wheel configuration because wheel hubs are usually offset between the wheel rim flanges. Flange 56 has a plurality of mounting holes 60 located in both radial and circumferential spaced relation from the body 57 enabling the anchor member 54 to be mounted to wheel hubs of varying sizes.

A swingable and extensible arm 51 in the form of a generally rectangular tubular horizontal body is detachably mounted on the anchor member 54. This arm supports and positions the hydraulic cylinder during bead breaking. A vertically extending threaded rod 62 extends perpendicularly from the underside of the body at one end thereof and is threaded into one of the anchor member female threaded fittings 55–55a. Threaded rod 62 has a shield 63 which protects it from damage if the body 61a is accidentally dropped. The shield or skirt 63 is round and tubular and has a slightly larger inside diameter than the outside diameter of the tubular body 57. The fit between the shield 63 and the tubular body 57 is such that the shield assists in supporting the arm relative the anchor member. It can be understood that the male and female portions of the fittings can be reversed or other rotatable fittings placed between the arm and anchor member without departing from the scope of the invention. Rectangular tubular body 61 includes telescopically coacting arm sections 61a and 61b, where arm section 61b moves relative arm section 61a to shorten or lengthen the arm. Section 61a includes a closed end wall 64 and a threaded bolt or jack screw 65 passing through a hole 65a therein. A female threaded fitting 70 located at the inner end of section 61b is engaged by jack screw 65, whereby turning jack screw 65 either retracts arm section 61b into section 61a, or allows it to be extended outwardly therefrom. Jack screw 65 may easily be turned by utilizing a wrench 59 shown in FIG. 17. At the free end of arm section 61b an internally threaded tubular sleeve 71 extends vertically through arm section 61b and provides a fitting into which threaded rod end 51 of cylinder 44 may engage providing a rigid vertical mounting for the cylinder. An extension arm 73, also shown in FIG. 18, having angularly offset ends with mounting holes therethrough, is attached at one end to the free end of arm section 61b at threaded fitting 72 by means of a bolt 74. At the opposite end of extension arm 73, a circumferential tread retaining tool 75 is mounted to fit over a segment of tire tread 42. Tread retaining tool 75, also shown in FIG. 17, includes an elongated plate 77 having an arcuately bent surface which approximates the curvature of tire tread 42. A male fitting 78 is located at the outside center of the arcuate plate 77 for engagement in a socket formed in extension arm 73.

Figures 13, 14, 15, 16, 17, 18, 19, 20, 21, 22:
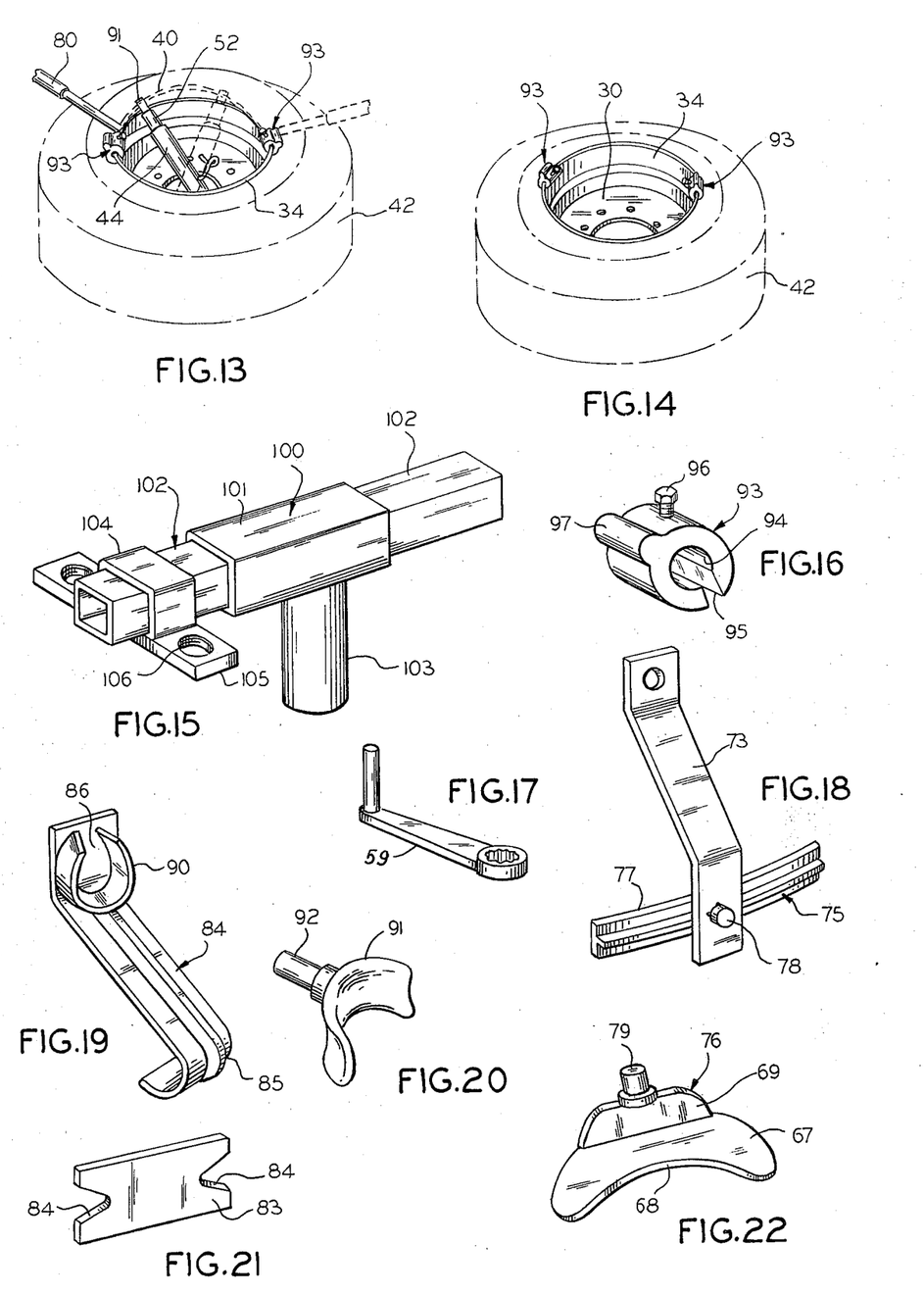
FIG. 13 shows a perspective view of the second tire bead being forced over the rim flange wherein tire irons are used along with the cylinder and forcing shoe to pry additional portions of the bead over the rim flange.
FIG. 14 is a perspective view showing the entire second bead mounted between the wheel rims in a position where, as soon as the C-clamps are removed, the tire may be inflated.
FIG. 15 shows a modification of the arm for the demounting assembly of the invention wherein a collar having a fitting for a hydraulic cylinder may be placed on and moved along the arm member on both sides of the arm.
FIG. 16 is an enlarged perspective view of a C-clamp used in mounting a tire.
FIG. 17 is a perspective view of a wrench for turning the jack screw on the demounting assembly.
FIG. 18 is a perspective view of an offset extension arm which attaches to the demounting assembly arm together with a tread retaining tool which fits around a segment of the circumference of the tire for demounting.
FIG. 19 is a perspective view of the cylinder retaining hook of the tire mounting assembly.
FIG. 20 is a perspective view of a U-shaped bead stretching shoe.
FIG. 21 is a perspective view of a tire iron connecting plate.
FIG. 22 is a perspective view of a bead breaking shoe.

A bead breaking shoe 76 is shown in FIGS. 1 and 2 attached to piston rod female fitting 53 and directly adjacent rim flange 34 on the side of the rim containing the drop center portion 35. The shoe is also shown in FIG. 22 and includes a substantially flat pad 67 having an arcuate inside edge 68 which approximates a segment of the outer curvature of the rim flange 34–34a, a plate 69 at the outer edge of pad 67 which is angled toward the vertical and serves as a mounting for male slip fitting 79 which matingly engages in piston rod female fitting 53. The shoe is positioned in place radially be extending or contracting arm 61, and circumferentially by rotating the arm on anchor member 54.

Figure 3:
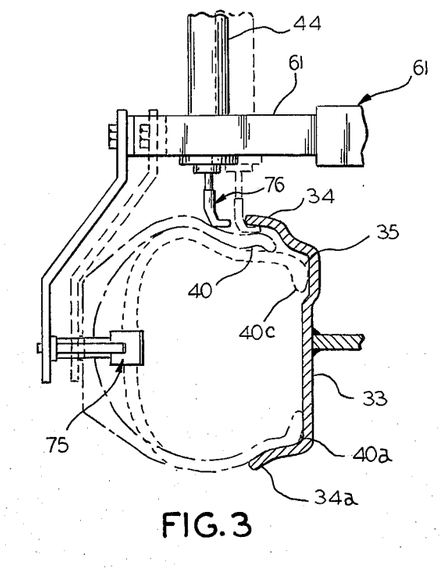
FIG. 3 is a cross-sectional view of a segment of the tire and wheel assembly and showing a portion of the demounting assembly and the manner of driving the bead into the wheel drop center portion.
Figure 4:
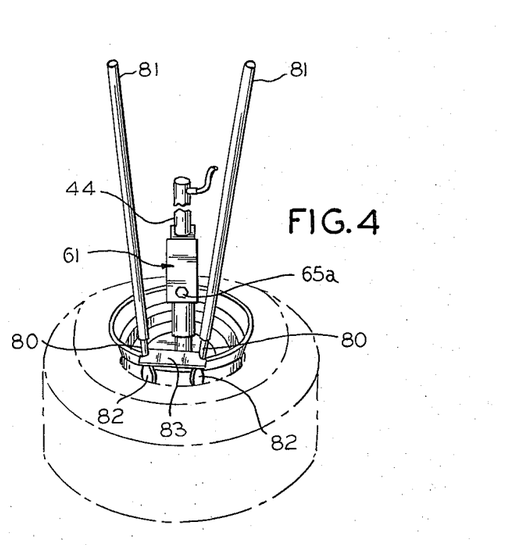
FIG. 4 is a perspective view similar to FIG. 1, but from a different direction and showing a brace of tire irons connected by a spacing plate and placed in a vertical position to apply leverage to a segment of the tire head opposite that portion forced into the drop center of the wheel for lifting the bead over the rim flange.
Figure 5:
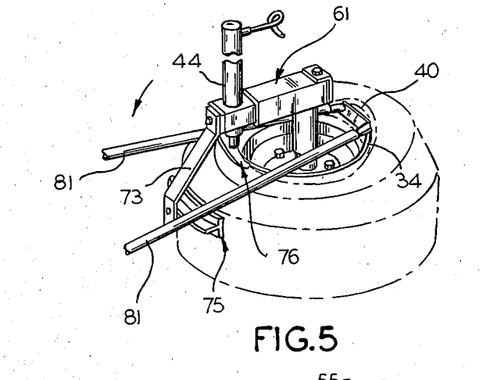
FIG. 5 is a perspective view similar to FIG. 4, but from a different direction to show a segment of the tire bead brought over the rim flange by the tire irons.
Figure 6:
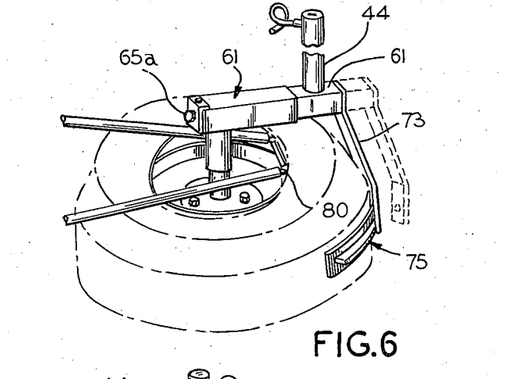
FIG. 6 is a perspective view similar to FIG. 5 wherein the tire tread retaining tool has been moved approximately 180° to stabilize that segment of the tire bead brought over the rim.

In operation, hydraulic pump 46 is activated by oscillating pump handle 48 thereby extending piston rod 52 vertically downward from the cylinder 44 forcing the tire bead 40 inwardly away from rim flange 34 as shown at 40b in FIG. 2. As shown in FIG. 1, bead breaking shoe 76 only covers a segment of tire bead 40 at one time. To break the entire bead 40, the hydraulic cylinder 44 and bead breaking shoe 76 is activated repeatedly at different circumferential positions until bead 40 and rim flange 34 are completely separated. Then, arm section 61b is extended until the bead breaking shoe 76 is adjacent a tire side wall 41 and two operations take place as shown in FIG. 3. First, cylinder 44 is actuated pushing side wall 41 and its adjacent bead portion 40 farther inward of wheel rim flange 34. Then the arm section 61b is retracted thereby moving tread retaining tool 75 inwardly from the phantom to the black line position shown in FIG. 3 forcing a segment of bead 40 to a position 40c in the wheel drop center portion 35. This causes an opposing segment of tire bead 40 to the pushed outward relative to the segment of wheel rim 34 located adjacent thereto. A pair of tire irons 80—80 together with extensions 81—81 are then used to pry the opposing segment of the bead portion 40 over rim flange 34 as shown in FIGS. 4 and 5. Each tire iron 80 has a flat oval-shaped end 82 which is placed under the bead 40. A tire iron connecting plate 83 shown in FIGS. 4–6 and 21 having opposed notched ends 84—84 coordinates use of the tire irons, one of which is placed in each notch. Rim flange 34 is used for a fulcrum as the tire irons are moved from vertical (FIG. 4) to horizontal position (FIG. 5) and a segment of tire bead 40 is pried over rim flange 34. It can be appreciated that any suitable long handled tire iron or the like may be used for these prying purposes. Also, a modification of the invention including a hydraulic bead lifting device is described below.

Figure 7:
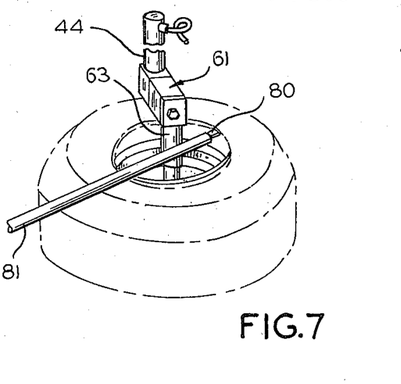
FIG. 7 is another perspective view showing a tire iron prying the rest of the bead over the rim flange.
Figure 8:
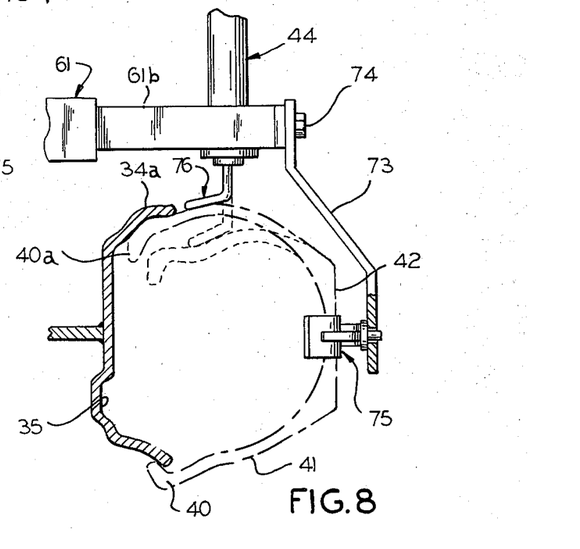
FIG. 8 is a partial section view similar to FIG. 3 wherein the bead breaking shoe is breaking the second tire bead from its adjacent rim flange after the tire and wheel assembly has been flipped 180°.

After a segment of the tire bead 40 is pried over the wheel rim, the tread retaining tool 75 and its extension arm 73 are removed from arm section 61b. Bead breaking shoe 76 is also returned to a retracted position and the arm 61 is rotated approximately 180° on the anchor member 54 to a position adjacent that segment of the tire bead 40 which is pried over the wheel rim 34. Then, tread retaining tool 75 and extension arm 73 are again connected to the extended end of arm section 61b is a position shown in FIG. 6. Next, arm section 61b is retracted by turning jack screw 65. This retraction causes tread retaining shoe 75 to press the tire bead 42 inward thereby taking pressure off the tire irons 80—80. A tire iron 80 may then be used to pry adjacent segments of tire bead 40 over the wheel rim 34. Then, as shown in FIG. 7, a single tire iron 80, using the shield 63 as a fulcrum, pries remaining segments of tire bead 40 over rim flange 34.

Figure 9:
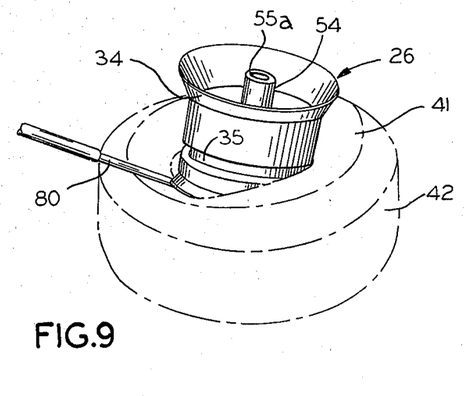
FIG. 9 is a perspective view showing the remaining tire bead placed in the rim drop center and a tire iron prying an opposing segment of the bead out or up over the rim flange.

The next step in the method is to unscrew arm 61 from the anchor member 54, flip the tire and wheel assembly with the anchor member over, and screw the threaded rod 62 into the opposing threaded fitting 55a. The structure as previously described in the first bead breaking operation is again utilized to break the second tire bead 40a from its wheel rim flange 34a. After the second tire bead 40a has been separated from its rim flange 34, the tire 27 is moved downward and a segment of the second tire bead 40a is placed in wheel drop center portion 35. A tire iron 80 is placed between an opposing segment of second tire bead 40a and first rim flange 34 and the opposing segment is pried thereover. A second tire iron 80 is again used to pry portions of tire bead 40a adjacent first tire iron 80 over rim flange 34 until the tire is completely off the wheel. Commonly, the second bead 40a is more easily demounted as tire weight helps to pull the bead over flange 34. As shown in FIG. 9, wheel 26 is located in an elevated position so tire 27 falls away from it when demounted. It can be appreciated the distance between the arm 61 and the adjacent rim flange may be adjusted by relationship between the rod 62 and fitting 55.

The tire mounting assembly of the invention is shown at FIG. 10 and includes a cylinder retaining hook 84, also shown in FIG. 19, having a curved or hook end 85 which hooks over the wheel hub central opening 32 and an offset end 86 having a retaining ring or socket 90 into which one end of the hydraulic cylinder is retained. The angle of the offset end allows hydraulic cylinder 44 to have an almost horizontally mounted position. Attached to the external end of piston rod 52 is a bead forcing shoe 91 also shown in FIG. 20 which is generally U-shaped. A male fitting 92 extends from the U-shaped portion and slidably fits in the female fitting 53 of the cylinder piston rod. The tire mounting structure includes a pair of C-shaped clamps 93—93 also shown in FIG. 16. Each clamp includes a generally cylindrical inner surface 94 and is slotted at 95. A lock bolt 96 is threaded through the outer shell of the clamp and is used to retain it in fixed position on the rim flange 34 when tightened as shown in FIG. 10. A bead retaining ridge 97 extends from the outer surface.

Figure 12:
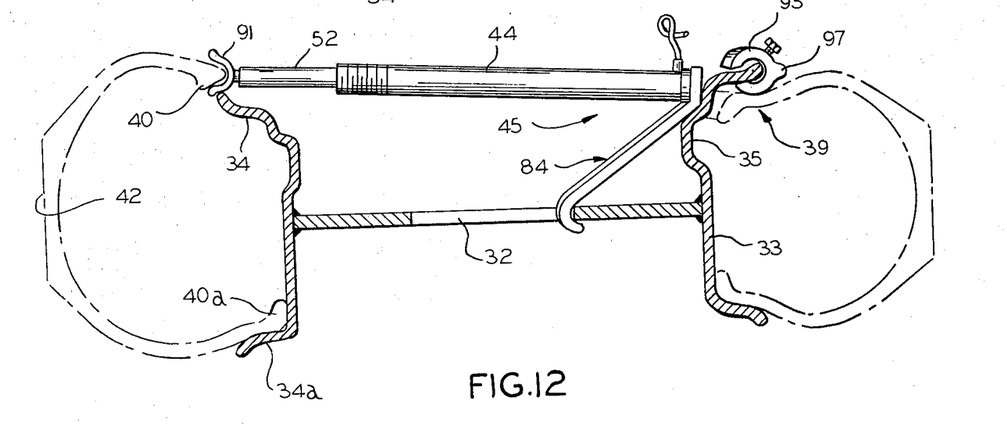
FIG. 12 is a cross-sectional view of the wheel and tire similar to that shown in FIG. 10 with the second tire bead placed over a portion of the rim flange, retained by C-clamps, and the tire mounting assembly in position.

In operation, C-clamps 93—93 are arranged in close proximity to each other on rim flange 34 and tire 27 is placed on top of rim 34 with a segment of bead 40a positioned under both rim flange 34 and C-clamps 93—93 as shown at 39 in FIG. 10. With the cylinder aligned to stretch a part of the head adjacent one of the clamps, the cylinder is actuated by the hydraulic pump 47 until bead forcing shoe 91 comes in contact with bead portion 40a and until the bead is forced outside the flange. Then, a tire iron (not shown) is used to force and temporarily hold portions adjacent that segment of the tire bead shown at 39 over the flange. This action is repeated at the other C-clamp. The locking bolt 96 on each C-clamp is loosened and the C-clamps are moved further apart and retightened sequentially in an increasing arc around rim flange 34. The process is repeated by withdrawing piston rod 52, repositioning the cylinder and re-activating same to force other segments over the rim flange with tire irons until the entire bead is positioned between the rim flanges. Then the entire tire 27 is moved downward on the rim until the second tire bead 40 is adjacent rim flange 34. A segment of bead 40 is placed under the wheel rim flange and C-clamp retainers 93 as at 39 in FIG. 12 are fixed in position. The method utilized with tire bead 40a is repeated with second tire bead 40 until it is entirely within the rim flanges. The end 50 of hydraulic cylinder 45 is retained in socket 86 of retaining hook 84 and piston rod 52 is extended until the bead stretching shoe 91 comes in contact with bead 40 and stretches the bead to a position which facilitates forcing over the rim with a tire iron. Again, tire irons (not shown) are used to pry segments of tire bead 40 over wheel rim flange 34. FIG. 13 shows the second tire bead being forced over rim flange 34 by the tire irons and hydraulic cylinder 44. Also, the arc between the C-clamps 93—93 has widened until the clamps are approximately opposite each other on rim flange 34. In FIG. 14 the second tire bead is completely mounted on the rim flange and after the C-clamps are removed, the tire will be ready for inflation, and use.

In FIG. 15, a modification of the arm is shown and generally designated by the numeral 100. The arm 100 includes a rectangular in cross section tubular section 101 open at both ends and slidably receiving a mating tubular arm section 102. A shield 103 and threaded rod (not shown) extend downwardly from theh arm section 100 to coact with the anchor member 54. A square tubular collar at 104 fits around arm section 102, is slidable therealong, and includes a laterally extending plate 105 having a threaded fitting 106 for threadedly receiving the hydraulic cylinder 44. The operation of arm 100 is similar to that of the first embodiment described. Arm 100 contains a threaded mounting shaft (not shown) for controlling the extended position of section 102. The collar is then laterally moved inward or outward along arm 100 until bead breaking shoe 76 is in proper position to separate a tire bead from a rim flange. Arm 100 may be turned on anchor member 54 in the same manner as arm 61. A tread retaining tool similar to that at 75 may be fitted to either end of arm 100.

Figure 23:
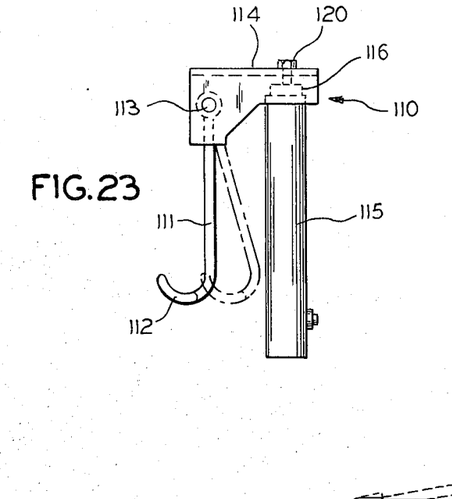
FIG. 23 is a vertical elevational view of a hydraulic bead lifting mechanism.
Figure 24:
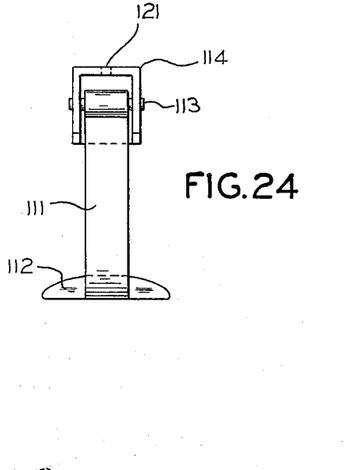
FIG. 24 is an end view of the bead lifting mechanism minus the portable hydraulic cylinder.

A modification of the invention which eliminates the use of the dual tire irons 80—80 together with extensions 81—81 and tire iron connecting plate 83 is shown generally at 110 in FIG. 23. A hydraulic bead lifting device 110 includes a bead lifting arm 111 having a laterally arcuately extending shoe 112 located at the distal end thereof and a pivotal mounting 113 connecting the arm 111 to the lifting force transfer member 114. A portable hydraulic cylinder 115 which may be similar to hydraulic cylinder 44 is attached to the lifting force transfer member 114 by any suitable means connecting the cylinder piston rod 116 thereto. In FIG. 23, bolt 120 is shown securing the force transfer member 114 to the cylinder piston rod 116 through an aperture 121 in the top of the force transfer member. In FIG, 24, the lifting force transfer member 114 and the pivotally connected bead lifting arm 111 are shown in a detailed end view minus the hydraulic cylinder 115.

Figure 25:
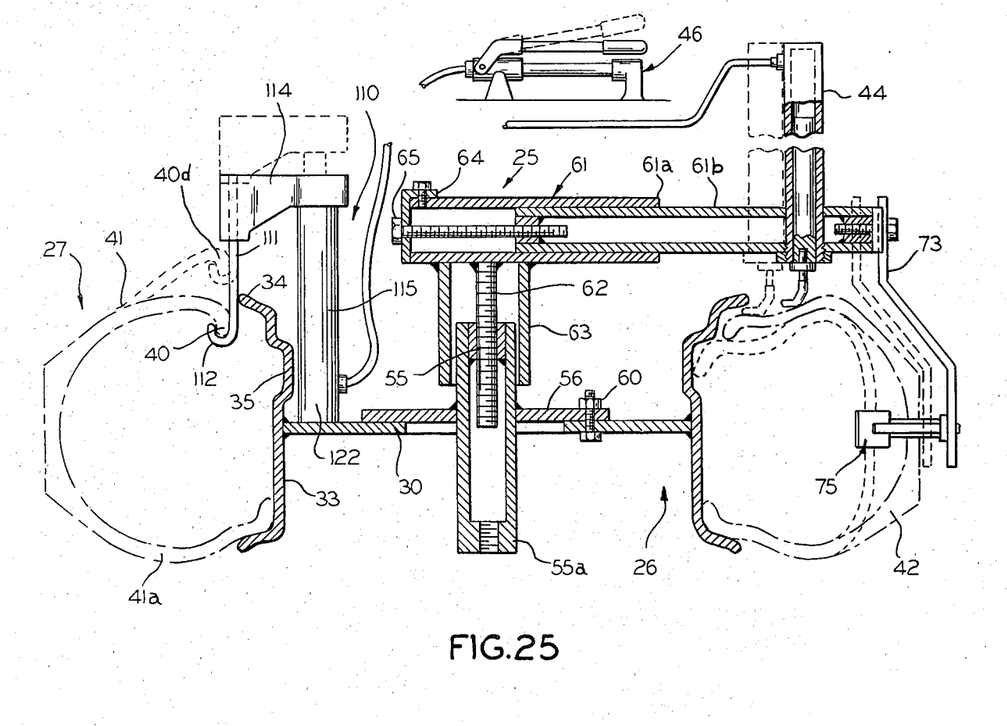
FIG. 25 is a full cross-sectional view enlarged from the detail cross section of FIG. 3 showing the bead breaking mechanism in operating position on the wheel.

In FIG. 25 the hydraulic bead lifting device is shown in mounted position in a full cross-sectional view of the tire demounting assembly which is an enlarged form of the detailed cross section in FIG. 3. In operation, the hydraulic bead lifting device 110 is positioned diametrically opposite the drop center portion 35 into which the tire bead 40 is positioned at 40c. First, the shoe portion 112 of the bead lifting arm 111 is maneuvered around and under the tire bead 40. The compact nature of the bead lifting device 110 and the pivotal mounting 113 of the bead lifting arm 111 enable easy maneuverability of the bead lifting show 112 into position. Second, the blank end 122 of the connected hydraulic cylinder 115 is set on the wheel hub 30 as close to the rim 33 as practicable. After the hydraulic cylinder 115 is firmly positioned against the wheel 26, the cylinder is activated by means of portable pump 46. The cylinder piston rod 116 is extended and the connected lifting force transfer member 114, and bead lifting arm 111 are moved to the position shown in phantom in FIG. 25 thereby lifting the tire bead 40 to position 40d over the wheel rim flange 34. After the bead 40 has been lifted over the wheel rim flange 34 in the manner thus described, a single tire iron 80 using the shield 63 as a fulcrum is used to pry the remaining portion of the bead over the wheel rim flange. Once the entire bead 40 is pried over wheel rim flange 34, the hydraulic bead lifting device 110 may be easily disengaged from the tire bead by movement or deactivation of the hydraulic cylinder 115.

It will be understood that modifications and variations may be affected without departing from the scope of the novel concepts of the present invention, but it is understood that this application is to be limited only by the scope of the appended claims.

The invention is hereby claimed as follows:

1. Portable tire changing assembly for demounting a heavy duty tire from a wheel having flanged drop center rim and a hub in the center of said wheel with a central opening extending therethrough, said assembly comprising an anchor member having a tubular body and flange means for attaching the body to the hub and substantially axially of the wheel so the opposed ends of the body extend to opposite sides of the hub, an extensible arm having connector means thereon for rotatably mounting said arm to either of said tubular body opposed ends, a sectional tubular body extending generally perpendicular to the connector means and laterally therefrom, said sectional tubular body including telescopically coacting sections and axially aligned threaded means for adjusting and applying an axial force to the sections to vary the arm length, and hydraulic cylinder socket means along the sectional tubular body, a hydraulic cylinder perpendicularly mounted to and retained by the socket means of said extensible arm, said cylinder having bead breaking means mounted thereon for forcing at least a segment of a tire bead from said rim flange, and means for actuating said cylinder.

2. The assembly of claim 1, wherein the socket means includes a fitting mounted in fixed position along the sectional tubular body of the extensible arm adjacent the free end thereof for mounting the hydraulic cylinder.

3. The assembly of claim 1 wherein the socket means includes a collar surrounding at least a portion of said sectional tubular body and which is slidable along and removable therefrom, and a fitting attached to the collar for mounting the hydraulic cylinder.

4. The assembly as defined in claim 1 wherein each of the opposed ends of said anchor member tubular body include a threaded fitting, and said connector means for rotatably mounting said extensible arm to either opposed end includes a complementary threaded fitting which matingly engages either of said fittings on the anchor member.

5. The assembly as defined in claim 1 wherein said bead breaking means comprises a bead breaking shoe having a substantially flat portion which is arcuate in outline, the radius of said arc approximating a radius of the wheel flange, a fitting in the center of said arc which is substantially at a right angle with said flat portion and fits in an external end of a piston in said hydraulic cylinder.

6. Portable tire changing assembly for demounting a heavy duty tire from a wheel having a flanged drop center rim and a hub in the center of said wheel with a central opening extending therethrough, said assembly comprising an anchor member having a tubular body and flange means for attaching the body to the hub and substantially axially of the wheel so the opposed ends of the body extend to opposite sides of the hub, an extensible arm having connector means thereon for rotatably mounting said arm to either of said tubular body opposed ends, a sectional tubular body extending generally perpendicular to the connector means and laterally therefrom, and hydraulic cylinder socket means along the sectional tubular body, a hydraulic cylinder perpendicularly mounted to and retained by the socket means of said extensible arm, said cylinder having bead breaking means mounted thereon for forcing at least a segment of a tire bead from said rim flange, means for actuating said cylinder, and a tire tread retaining tool attached to the free end of said extensible arm member for assisting in forcing a portion of said tire into said wheel drop center portion, said tread retaining tool including an elongated arcuate surface approximating the curvature of the circumference of said tire and extension means connecting said elongated surface to the free end of said extensible arm and maintaining said tool outwardly and downwardly from said extensible arm whereby said tool fits the tire longitudinally along a portion of said circumference.

7. The assembly as defined in claim 1 further comprising portable hydraulic bead lifting means coacting with the wheel hub and rim for forcing at least a portion of said bead over said wheel rim flange.

8. The assembly as defined in claim 7 wherein said bead lifting means includes a bead lifting shoe mechanism, a distal end of which hookingly engages said tire bead, and a portable hydraulic cylinder attached to said bead lifting shoe mechanism for driving said mechanism away from the flanged rim when the distal end thereof is fitted around a portion of said tire bead causing said portion to be lifted over said flanged rim.

9. Portable tire changing assembly for mounting a heavy duty tire on a wheel having a flanged drop center rim including a hub in the center of said rim with a central opening extending therethrough, said assembly comprising a hydraulic cylinder, means for operating said hydraulic cylinder, and means mounted on said hydraulic cylinder for engaging at least a portion of a bead on said tire to stretch over said rim flange, a cylinder retaining hook including a curved end which engages the central opening in the hub and an offset end bearing against the wheel rim with means thereon for retaining one end of said cylinder and allowing said cylinder to be mounted in any angular position relative said wheel, and a pair of clamps each having means thereon for clamping onto one of said rim flanges and means for retaining a portion of the tire bead between the rim flanges.

10. The assembly defined in claim 9 wherein said bead engaging means on said cylinder comprises a bead engaging shoe having a generally U-shape surface and a fitting at the outside center of the bite portion of said shoe which fits in a socket at the external end of a piston in said cylinder.

11. Portable tire changing apparatus for mounting and demounting heavy duty tires upon wheels having a flanged drop center rim and a hub in the center of said flanged rim with a central opening extending therethrough, said apparatus including a portable hydraulic cylinder, a pump for operating the cylinder, and a tire demounting assembly comprising an anchor member having a tubular body and flange means for attaching the body to the hub and substantially axially of the wheel so the opposed ends of the body extend to opposite sides of the hub, an extensible arm having connector means thereon for rotatable mounting to either of said tubular body opposed ends, a sectional tubular body extending generally perpendicular to the connector means and laterally therefrom, said sectional tubular body including telescopically coacting sections and axially aligned threaded means for adjusting and applying an axial force to the sections to vary the arm length, and hydraulic cylinder socket means along the sectional tubular body, said portable hydraulic cylinder being removably mounted to said socket means in a position parallel to said anchor member tubular body, bead breaking means capable of being mounted on said hydraulic cylinder for engaging at least a segment of a bead of said tire to cause it to disengage from a segment of said flanged rim which, as mounted, is contiguous with said bead.

12. Portable tire changing apparatus for mounting and demounting heavy duty tires upon wheels having a flanged drop center rim and a hub in the center of said flanged rim with a central opening extending therethrough, said apparatus including a portable hydraulic cylinder, a pump for operating the cylinder, and a tire demounting assembly comprising an anchor member having a tubular body and flange means for attaching the body to the hub and substantially axially of the wheel so the opposed ends of the body extend to opposite sides of the hub, an extensible arm having connector means thereon for rotatable mounting to either of said tubular body opposed ends, a sectional tubular body extending generally perpendicular to the connector means and laterally therefrom, and hydraulic cylinder socket means along the sectional tubular body, said portable hydraulic cylinder being removably mounted to said socket means in a position parallel to said anchor member tubular body, bead breaking means capable of being mounted on said portable hydraulic cylinder for engaging at least a segment of a bead of said tire to cause it to disengage from a segment of the flanged rim, and a tire mounting assembly including a cylinder retaining hook having a curved end which engages the central opening in said hub and having an offset end bearing against the wheel rim with means thereon adapted to removably retain one end of said portable hydraulic cylinder, a pair of clamps each having means thereon for clamping onto one of said rim flanges and means for retaining a portion of said tire bead between said rim flanges, and bead stretching means capable of being removably mounted on said portable hydraulic cylinder for engaging and stretching said tire bead over said flanged rim as said portable hydraulic cylinder is retained in said mounting hook.

13. Portable tire changing apparatus for mounting and demounting heavy duty tires upon wheels having a flanged drop center rim and a hub in the center of said flanged rim with a central opening extending therethrough, said apparatus including a portable hydraulic cylinder, a pump for operating the cylinder, and a tire demounting assembly comprising an anchor member having a tubular body and flange means for attaching the body to the hub and substantially axially of the wheel so the opposed ends of the body extend to opposite sides of the hub, an extensible arm having connector means thereon for rotatable mounting to either of said tubular body opposed ends, a sectional tubular body extending generally perpendicular to the connector means and laterally therefrom, and hydraulic cylinder socket means along the sectional tubular body, said portable hydraulic cylinder being removably mounted to said socket means in a position parallel to said anchor member tubular body, bead breaking means capable of being mounted on said portable hydraulic cylinder for engaging at least a segment of a bead of said tire to cause it to disengage from a segment of said flanged rim which, as mounted, is contiguous with said bead, and a tire tread retaining tool attached to the free end of said extensible arm member, said tread retaining tool including an elongated arcuately bent surface approximating the curvature of the circumference of said tire and an extension arm connecting said elongated plate to the free end of said extensible arm and maintaining said tool outwardly and downwardly from said extensible arm whereby said tool fits the tire longitudinally along a portion of said circumference.

14. A method of demounting a heavy duty tire from a drop center wheel and tire assembly utilizing a portable tire demounting assembly, said wheel and tire assembly including a flanged drop center rim and a hub in the center of said rim with a central opening extending therethrough, and a heavy duty tire mounted on said rim having bead portions adjacent each of said rim flanges, side walls outwardly adjacent each of said bead portions and a circumferential tread attached at its margins to the outermost portion of each side wall, and said tire demounting assembly including an anchor member having a tubular body and flange means for attaching the body to the hub of said wheel, an extensible arm rotatably mounted to said anchor member and extending substantially perpendicular to said tubular body, a tread retaining tool attached to the free end of said extensible arm for assisting the forcing of a portion of said tire bead into said wheel rim drop center, a hydraulic cylinder and means for actuating said cylinder, said hydraulic cylinder perpendicularly mounted to and retained by said extensible arm, and a bead breaking shoe attached to the end of a piston extending from said cylinder, said method comprising the steps of affixing said tire demounting assembly to said wheel and tire assembly, activating the hydraulic cylinder and bead breaking shoe attached thereto in said assembly to force at least a segment of the bead of said tire inwardly away from a flange of said wheel, moving said extensible arm circumferentially along the bead portion of said tire and activating said hydraulic cylinder and bead breaking shoe repeatedly to disengage the entire bead of one side of said tire from said rim flange, forcing a segment of said bead into said drop center portion of said wheel rim by extending said bead breaking shoe upon a segment of said side wall of said tire and simultaneously inwardly retracting said tire tread retaining tool to force the tread radially inward, lifting a tire bead segment circumferentially opposite said segment forced into said drop center portion over said wheel rim flange, enlarging the portion of said bead pried over the rim flange by rotating said extensible arm to a position over said pried bead portion and again retracting said tread retaining tool while simultaneously forcing adjacent portions of said bead over said rim flange with a tire iron using said anchor member tubular body as a fulcrum, removing the extensible arm of said assembly from said anchor member attached to said wheel assembly, turning said wheel assembly over to the opposite side thereof for breaking the opposite bead, and replacing said extensible arm on said anchor member, activating said bead breaking shoe on the tire bead, separating or breaking said bead from said rim flange and forcing a segment of said bead into the rim drop center portion, and lifting said bead over said opposing rim flange of said wheel until said tire is completely free of said wheel.

15. The method of claim 14 wherein said tire demounting assembly further comprises a hydraulic bead lifting device including a bead lifting shoe mechanism and a portable hydraulic cylinder attached thereto, and wherein lifting said tire bead segment over said wheel rim flange includes the steps of, positioning a curved distal end of said shoe mechanism between said bead and said wheel rim flange and under a segment of said tire bead, positioning the blank end of said portable hydraulic cylinder against and abutting said wheel hub and rim adjacent said tire bead segment, and actuating said portable hydraulic cylinder to lift said bead lifting mechanism and force said segment over said tire bead over said wheel rim flange.

16. A method of mounting a heavy duty tire on a drop center wheel utilizing a tire mounting assembly wherein said wheel includes a flanged drop center rim, and a hub in the center of said rim with a central opening extending therethrough, said tire includes a circumferential tread inwardly extending side walls attached to the margins of said tread and a circular bead portion at the interior margin of each side wall, and said tire mounting assembly includes a hydraulic cylinder, means for operating said cylinder, a bead stretching shoe attached to a piston on said hydraulic cylinder, a cylinder retaining hook including a curved end and an offset hydraulic cylinder mounting end, a pair of C-clamps, and at least one tire iron, said method comprising the steps of placing a portion of a first bead of said heavy duty tire over a rim flange of said wheel and securing said bead in position by fastening said pair of C-clamps to said wheel rim flange inside an arcuate portion of said flange traversed by said first tire bead, then engaging said curved portion of said cylinder retaining hook to said hub of said wheel through a central opening therein, mounting said hydraulic cylinder with attached bead stretching shoe to said hook, and positioning the shoe to engage the first bead adjacent a position circumferentially opposite said secured portion, and activating said cylinder and shoe to stretch said bead over a larger portion of said rim flange than previously secured and prying bead portions immediately adjacent said secured portion over said rim flange using said tire iron, repositioning said C-clamps in a wider arc around said rim flange as more of said bead is pried over said flange, repeating said cylinder actuating and tire iron prying around said rim flange until the bead is completely over the flange, placing a portion of the second tire bead on an opposite side of said tire over said wheel rim flange and securing said bead in position using said C-clamps, positioning said bead stretching shoe to engage the second bead at a position adjacent that position circumferentially opposite said secured portion, and activating said cylinder and shoe to stretch said second bead over a larger portion of said rim flange than previously secured and prying bead portions immediately adjacent said secured portion over said rim flange using a tire iron, repositioning said C-clamps in a wider arc around said rim flange as more of said bead is pried over said flange, repeating said cylinder actuating and tire iron prying around said rim flange until the bead is completely over the flange, and removing said C-clamps.

\* \* \* \* \*

UNITED STATES PATENT AND TRADEMARK OFFICE
CERTIFICATE OF CORRECTION

PATENT NO. : 3,942,575
DATED : March 9, 1976
INVENTOR(S) : Oscar C. Blomgren, Sr.; Oscar C. Blomgren, Jr.

It is certified that error appears in the above-identified patent and that said Letters Patent are hereby corrected as shown below:

```
Col. 3, Line 28, delete "head" and insert --bead--;
Col. 4, Line 42, delete "actuated" and insert --attached--;
        Line 68, delete "deactivated" and insert
                 --deactuated--;
Col. 5, Line 15, delete "51" and insert --61--;
Col. 6, Line 26, delete "the" and insert --be--;
        Line 53, delete "is" and insert --in--;
Col. 8, Line 15, delete "theh" and insert --the--;
        Line 61, delete "show" and insert --shoe--;
```

Signed and Sealed this

Sixteenth Day of November 1976

[SEAL]

Attest:

RUTH C. MASON
Attesting Officer

C. MARSHALL DANN
Commissioner of Patents and Trademarks